United States Patent
Hida et al.

(10) Patent No.: US 8,164,288 B2
(45) Date of Patent: Apr. 24, 2012

(54) MOTOR CONTROL DEVICE AND GENERATOR CONTROL DEVICE

(75) Inventors: Hajime Hida, Osaka (JP); Yoshio Tomigashi, Osaka (JP); Kenji Ueyama, Osaka (JP)

(73) Assignee: Sanyo Electric Co., Ltd. (JP)

( * ) Notice: Subject to any disclaimer, the term of this patent is extended or adjusted under 35 U.S.C. 154(b) by 446 days.

(21) Appl. No.: 12/429,515

(22) Filed: Apr. 24, 2009

(65) Prior Publication Data

US 2009/0267550 A1 Oct. 29, 2009

(51) Int. Cl.
*H02P 6/12* (2006.01)

(52) U.S. Cl. .............. 318/400.15; 318/400.32; 318/810; 318/437; 318/563; 180/446

(58) Field of Classification Search .................. 318/400, 318/400.15, 400.23, 437, 400.32, 810, 563; 180/446

See application file for complete search history.

(56) References Cited

U.S. PATENT DOCUMENTS

| | | | |
|---|---|---|---|
| 2004/0056629 A1* | 3/2004 | Maeda et al. | 318/719 |
| 2005/0146306 A1* | 7/2005 | Ha et al. | 318/807 |
| 2007/0205041 A1* | 9/2007 | Nishizaki et al. | 180/446 |
| 2009/0167224 A1* | 7/2009 | Miura et al. | 318/400.23 |

FOREIGN PATENT DOCUMENTS

| | | |
|---|---|---|
| JP | 7298696 | 11/1995 |
| JP | 3411878 | 6/2003 |
| JP | 2003210000 | 7/2003 |
| JP | 2005102467 | 4/2005 |
| JP | 2007259686 | 10/2007 |

* cited by examiner

*Primary Examiner* — Walter Benson
*Assistant Examiner* — Jorge Carrasquillo
(74) *Attorney, Agent, or Firm* — NDQ&M Watchstone LLP (57) ABSTRACT

To estimate a fluctuation component of the torque generated at the motor accurately, a motor control device (3) which controls a motor with a stator having armature winding and a rotor having a permanent magnet is provided to include a torque fluctuation component estimation unit for estimating a torque fluctuation component generated at the motor based on flux-linkage of the armature winding and an armature current that flows the armature winding. The torque fluctuation component estimation unit estimates the torque fluctuation component ($T_{rp}$) based on an inner product ($F_d \cdot i_d + F_q \cdot i_q$) of a flux-linkage vector which is a vectorial representation of the flux-linkage and a current vector which is a vectorial representation of the armature current.

11 Claims, 6 Drawing Sheets

MOTOR CONTROL DEVICE AND GENERATOR CONTROL DEVICE

CROSS REFERENCE TO RELATED APPLICATIONS

This application claims priority based on 35 USC 119 from prior Japanese Patent Application No. P2008-115218 filed on Apr. 25, 2008, the entire contents of which are incorporated herein by reference.

BACKGROUND OF THE INVENTION

1. Field of the Invention

The invention relates to a motor control device for controlling a motor and a generator control device for controlling a generator.

2. Description of Related Art

There has been proposed a system that controls a motor by estimating torque being generated at the motor and controlling the motor by using the estimated torque.

In this type of system, torque generally is estimated by computing an exterior product of a flux-linkage vector of the armature winding provided at a stator and a current vector of the current flowing at the armature winding (see Japanese Patent Laid-Open No. 2003-210000 and Japanese Patent Laid-Open No. 7-298696). There also has been proposed a method to estimate torque from input electric power information to a motor and rotating speed information of the motor (see Japanese Patent Laid-Open No. 2005-102467).

Now, when a synchronous motor with embedded magnets is used as a motor, there often exist harmonic in the magnetic flux distribution of the magnet with respect to the magnetic pole position (rotor position) and in the inductance distribution. In other words, for example the flux of the permanent magnet linked to the U-phase armature winding of the stator ideally has a sinusoidal wave pattern with respect to the positional changes of the magnetic pole, but in reality, such a wave pattern includes the harmonic, which also causes distortion in the induced voltage generated by the rotation of the permanent magnet. Similarly, d-axis inductance and q-axis inductance of the armature winding also include the harmonic. It is known that such harmonic becomes a cause of torque ripple.

In the conventional torque estimation methods as the ones described above, this fluctuation component of the torque (torque ripple) cannot be estimated well. As a result, the error between an instantaneous value of the estimated torque and an instantaneous value of the actual torque increases and the motor control deteriorates from what is ideal. Reasons that the fluctuation component of the torque cannot be estimated well in the conventional torque estimation methods will be described below. In addition, while the conventional problem relating to the motor control was explained, similar problem occurs when controlling a generator.

Thus, the invention aims to provide a motor control device that can estimate the fluctuation component of the torque generated at the motor well, and a generator control device that can estimate the fluctuation component of the torque generated at the generator well.

SUMMARY OF THE INVENTION

One aspect of the invention is a first motor control device that controls a motor with a stator having armature winding and a rotor having a permanent magnet, the first motor control device including a torque fluctuation component estimation unit for estimating a torque fluctuation component generated at the motor based on flux-linkage of the armature winding and an armature current that flows the armature winding, in which the motor control is performed based on the estimated torque fluctuation component, and in which the torque fluctuation component estimation unit estimates the torque fluctuation component based on an inner product of a flux-linkage vector which is a vectorial representation of the flux-linkage or a vector according to the flux-linkage and a current vector which is a vectorial representation of the armature current. By being based on the above inner product, the torque fluctuation component can be estimated well.

In particular, for example the inner product is an inner product of the flux-linkage vector and the current vector, and the torque fluctuation component estimation unit estimates the torque fluctuation component based on the amount of inner product change with respect to the amount of magnetic pole position change of the rotor per unit time.

Alternatively, for example the torque fluctuation component estimation unit may derive differential information or difference information of the flux-linkage which represents the amount of flux-linkage change with respect to the amount of magnetic pole position change of the rotor per unit time, in which a vector of the differential information or the difference information is a vector according to the flux-linkage vector, and in which the inner product is an inner product of a vector according to the flux-linkage vector and the current vector.

In addition, the amount of the magnetic pole position change of the rotor may be derived from information on the detected or estimated magnetic pole position itself, or may be derived from the unit time and rotation speed of the rotor.

Another aspect of the invention is a second motor control device that controls a motor with a stator having armature winding and a rotor having a permanent magnet, the second motor control device including a torque fluctuation component estimation unit for estimating a torque fluctuation component generated at the motor based on input electric power to the motor for driving the rotor, rotation speed of the rotor, and an exterior product of a flux-linkage vector which is a vectorial representation of the flux-linkage of the armature winding and a current vector which is a vectorial representation of the armature current that flows the armature winding, in which the motor is controlled based on the estimated torque fluctuation component.

By further considering the exterior product in addition to the input electric power to the motor and the rotation speed, the torque fluctuation component can be estimated well.

In particular, for example the torque fluctuation component estimation unit estimates the torque fluctuation component from a difference between a value obtained by dividing the input electric power by the rotation speed, or dividing the input electric power from which loss electric power including a loss at the armature winding is subtracted by the rotation speed, and a value that is proportional to the exterior product.

Also, for example, the above first or second motor control device performs vector control of the motor based on the estimated torque fluctuation component.

In particular, for example, the above first or second motor control device may include a current detection unit for detecting the armature current by using a current sensor, a torque current component derivation unit for deriving a torque current component of the detected armature current based on the magnetic pole position of the rotor, and a torque/current conversion unit for converting the estimated torque fluctuation component to current information by using a torque constant, in which the derived torque current component is corrected by using the current information, and the vector control is performed such that the corrected torque current component follows a torque current command value according to a target value for the torque.

Another aspect of the invention is a first generator control device that controls a generator with a stator having armature winding and a rotor having a permanent magnet, the first generator control device including a torque fluctuation component estimation unit for estimating a torque fluctuation component generated at the generator based on flux-linkage of the armature winding and an armature current that flows the armature winding, in which the generator control is performed based on the estimated torque fluctuation component, and the torque fluctuation component estimation unit estimates the torque fluctuation component based on an inner product of a flux-linkage vector which is a vectorial representation of the flux-linkage or a vector according to the flux-linkage and a current vector which is a vectorial representation of the armature current.

Another aspect of the invention is a second generator control device that controls a generator with a stator having armature winding and a rotor having a permanent magnet, the second generator control device including a torque fluctuation component estimation unit for estimating a torque fluctuation component generated at the generator based on generated electric power of the generator by the rotation of the rotor, rotation speed of the rotor, and an exterior product of a flux-linkage vector which is a vectorial representation of the flux-linkage of the armature winding and a current vector which is a vectorial representation of the armature current that flows the armature winding, in which the generator is controlled based on the estimated torque fluctuation component.

According to the invention, it is possible to provide a motor control device that can estimate the fluctuation component of the torque generated at a motor well and a generator control device that can estimate the fluctuation component of the torque generated at a generator well.

DETAILED DESCRIPTION OF EMBODIMENTS

Embodiments of the invention will be described with reference to the accompanying drawings below. In each of the drawings to be referred to, the same or similar reference numbers are assigned to the same or similar parts and overlapping explanations for the same parts are omitted in principle. The first and the second embodiments will be explained later, but first the matters common to each embodiment or the items being referred to in each of the embodiments will be explained.

Figure 1:
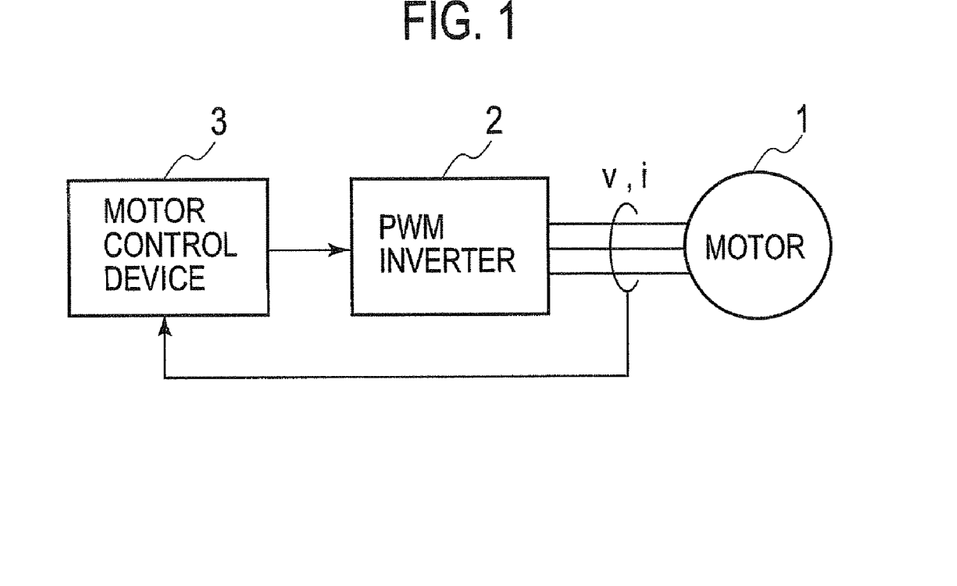
FIG. 1 is a schematic block diagram of a motor drive system according to an embodiment of the invention.
Figure 2:
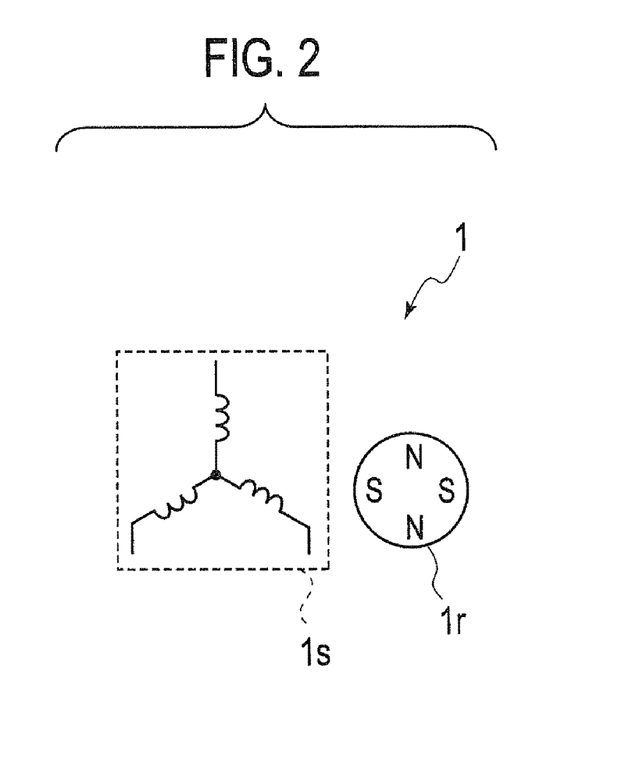
FIG. 2 is a block diagram showing an internal structure of the motor of FIG. 1.

FIG. 1 is a schematic block diagram of the motor drive system according to an embodiment of the invention. The motor drive system of FIG. 1 includes a motor 1, a voltage conversion circuit 2, and a motor control device 3. FIG. 2 is a block diagram showing an internal structure of the motor 1.

The motor 1 is a three-phase permanent magnet synchronous motor and includes a rotor 1r having a permanent magnet and a stator 1s having three-phase armature winding (that is U-phase, V-phase, and W-phase armature winding).

The voltage conversion circuit 2 for example is a PWM (Pulse Width Modulation) inverter. The PWM inverter as the voltage conversion circuit 2 converts a DC voltage given from a DC power source (not shown) to a three-phase AC voltage using pulse width modulation, and applies the three-phase AC voltage to the motor 1. The three-phase AC voltage applied to the motor 1 is composed of a U-phase voltage $v_u$ which indicates the voltage to be applied to the U-phase armature winding, a V-phase voltage $v_v$ which indicates the voltage to be applied to the V-phase armature winding, and a W-phase voltage $v_w$ which indicates the voltage to be applied to the W-phase armature winding. The entire voltage applied to the motor 1, which is a combined voltage of the U-phase voltage $v_u$, the V-phase voltage $v_v$, and the W-phase voltage $v_w$, will be called a motor voltage (motor terminal voltage) and will be indicated by the symbol v.

The U-phase component, the V-phase component, and the W-phase component of the current that flows in the motor 1 by the application of the motor voltage v, that is, the current that flows in the U-phase, V-phase, and W-phase armature winding will be called respectively a U-phase current $i_u$, a V-phase current $i_v$, and a W-phase current $i_w$. The entire current that flows in the motor 1, which is a combined current of the U-phase current $i_u$, the V-phase current $i_v$, and the W-phase current $i_w$, will be called a motor current (armature current) and will be indicated by the symbol i.

Figure 3A:
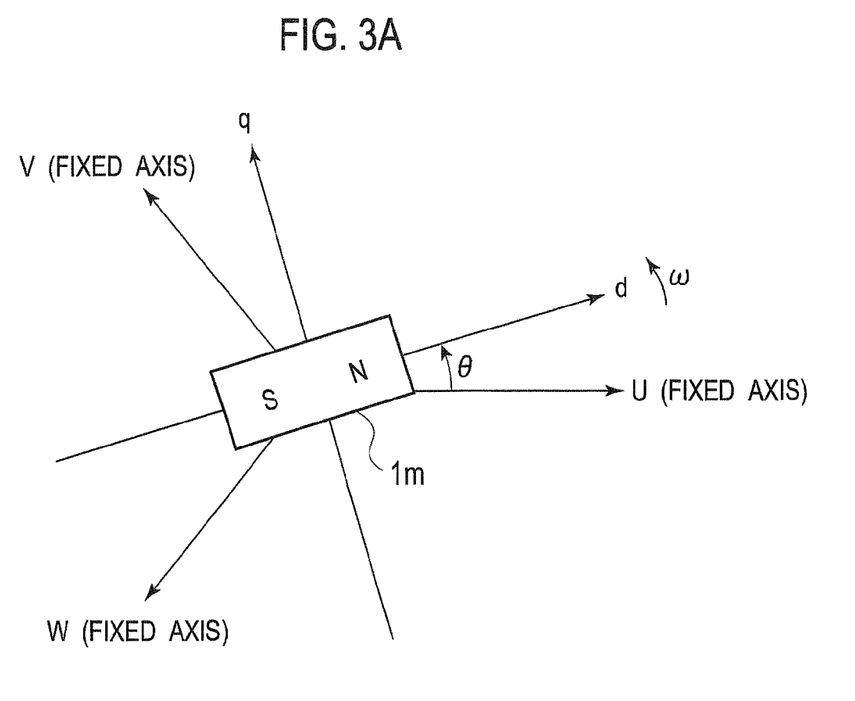
FIGS. 3A and 3B are analytical model diagrams of the motor as shown in FIG. 1.
Figure 3B:
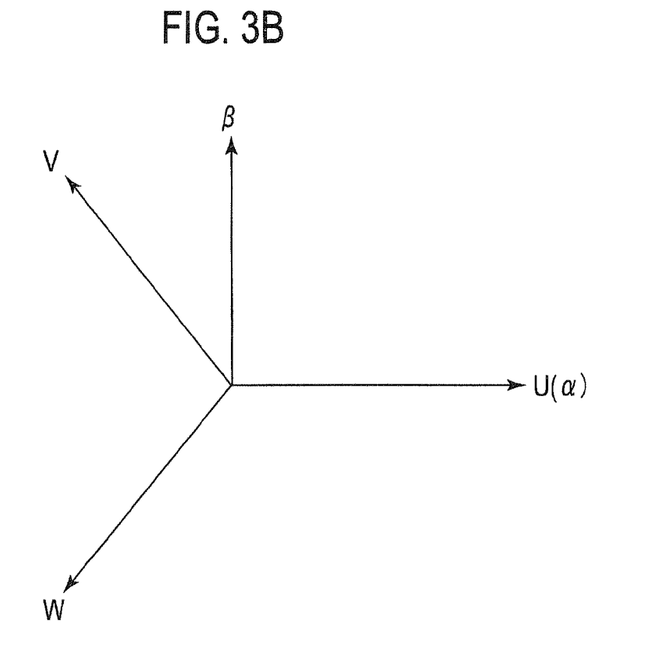

FIGS. 3A and 3B show analytical model diagrams of the motor 1. In FIG. 3A, the U-phase, V-phase, and W-phase fixed axes of the armature winding (which also will be called the U-phase axis, the V-phase axis, and the W-phase axis) are shown. The reference number 1m shows a permanent magnet provided to the rotor 1r of the motor 1. The phase of the V-phase axis is advanced by 120 degrees in electric angle with respect to the U-phase axis, and the phase of the W-phase axis is further advanced by 120 degrees in electric angle with respect to the V-phase axis. In a rotating coordinate system that rotates at the same speed as the rotation speed of the magnetic flux created by the permanent magnet 1m, the direction of the magnetic flux created by the permanent magnet 1m is taken as the d-axis, and the q-axis is taken at the phase advanced by 90 degrees in electric angle from the d-axis. In FIGS. 3A and 3B, the counterclockwise direction corresponds to the direction of the phase advancement. The d-axis and the q-axis will be called collectively as the dq axes and the rotating coordinate system that takes the d-axis and the q-axis as its coordinate axes will be called the dq coordinate system.

The dq axes rotate and their rotation speed is expressed by ω. Moreover, in the dq coordinate system, the d-axis angle (phase) viewed from the U-phase axis is expressed by θ. The angle expressed by θ is an angle in the electric angle and it is generally called rotor position or magnetic pole position. The rotation speed expressed by ω is angular speed in the electric angle.

The state quantity expressed by θ (and $θ_m$ which will be described below) will be called magnetic pole position and the state quantity expressed by ω (and $ω_m$ which will be described below) will be called rotation speed below. In addition, the state quantity also may be read as the physical quantity.

Also, FIG. 3B shows a relationship among the U-phase axis, the V-phase axis, and the W-phase axis, and the a axis and the β axis that are orthogonal to each other. The a axis coincides with the U-phase axis, and the β axis is advanced by 90 degrees by electric angle with respect to the a axis. The U-phase axis, the V-phase axis, the W-phase axis, the a axis, and the β axis are fixed axes that are fixed irrespective of the rotation of the rotor 1r. The a axis and the β axis will be called collectively as the aβ axes and the fixed coordinate system that takes the a axis and the β axis as its coordinate axes will be called the aβ coordinate system. Both the dq coordinate system and the aβ coordinate system are two-dimensional orthogonal coordinate systems.

Moreover, state quantities are defined as follows. That is, the d-axis component, the q-axis component, the a-axis component, and the β-axis component of the motor voltage v will be called respectively as a d-axis voltage, a q-axis voltage, an a-axis voltage, and a β-axis voltage, and will be expressed by the symbols $v_d$, $v_q$, va and vβ. The d-axis component, the q-axis component, the a-axis component, and the β-axis component of the motor current i will be called respectively as a d-axis current, a q-axis current, an a-axis current, and a β-axis current, and will be expressed by the symbols $i_d$, $i_q$, ia and iβ. Combined flux-linkage of the three-phase armature winding will be expressed by F. The d-axis component, the q-axis component, the a-axis component, and the S-axis component of the armature flux-linkage will be called respectively as a d-axis magnetic flux, a -axis magnetic flux, an a-axis magnetic flux, and a β-axis magnetic flux, and will be expressed by the symbols $F_d$, $F_q$, Fa and Fβ. The armature flux-linkage F corresponds to a combined magnetic flux of the field magnetic flux by the permanent magnet 1m (which corresponds to $F_a$ as described below) and the armature reaction magnetic flux by the motor current i. The $F_a$ indicates an armature flux-linkage by the permanent magnet 1m. $L_d$ and the $L_q$ respectively indicate d-axis inductance (the d-axis component of armature winding inductance) and q-axis inductance (the q-axis component of armature winding inductance). $R_a$ indicates a resistance value per phase of the armature winding. $P_n$ indicates the paired number of poles. $F_{d|t=0}$, $F_{q|t=0}$, $Fa_{|t=0}$, and $Fβ_{|t=0}$ respectively indicate values of $F_d$, $F_q$, Fa and Fβ at a certain reference time $t_0$ (that is starting values for the $F_d$, $F_q$, Fa and Fβ). In addition, the $F_a$, $L_d$, $L_q$, and $P_n$ are predetermined according to the characteristics of the motor 1.

In this specification, for simplicity of descriptions, there is an instance in which the state quantity corresponding to a symbolic description such as the $i_d$ may be expressed only by such a symbolic expression. In other words, in this specification, for example "$i_d$" and "d-axis current $i_d$" or "d-axis current value $i_d$" may indicate the same thing.

Next, methods for estimating the torque used for controlling the motor 1 will be explained. As the torque estimation methods, the first and second torque estimation methods will be explained.

[First Torque Estimation Method]

First, the first torque estimation method will be explained. A known torque estimation formula is shown at formula (A-1) below. The $F_d$ and $F_q$ in the formula (A-1) can be obtained by coordinate-converting the Fa and Fβ obtained by formulas (A-2) and (A-3) onto the dq axis. In a case that the vectorial representation of the armature flux-linkage F is called a flux-linkage vector and the vectorial representation of the motor current i is called a current vector, the torque estimation is performed by computing an exterior product of the flux-linkage vector and the current vector at the formula (A-1). The torque $T_{eo}(θ)$ that is estimated by using the formula (A-1) is a function of θ. In addition, dt indicates a very small amount of time. The integration at each right side member of the formulas (A-2) and (A-3) is the integration with respect to the time t. When computing the Fa and Fβ at the present time, the integral interval is from the reference time $t_0$ to the present time.

$$T_{eo}(θ)=P_n(φ_d i_q - φ_q i_d) \quad \text{(A-1)}$$

$$φ_α = \int(v_α - R_a i_α)dt + φ_{α|t=0} \quad \text{(A-2)}$$

$$φ_β = \int(v_β - R_a i_β)dt + φ_{β|t=0} \quad \text{(A-3)}$$

Now, when using a motor such as the synchronous motor with embedded magnets as the motor 1, there often exists harmonic in the magnetic flux distribution of the magnet with respect to the a magnetic pole position θ and in the inductance distribution. In other words, for example the flux of the permanent magnets linked to the U-phase armature winding ideally has a sinusoidal wave pattern with respect to the changes of the magnetic pole position θ, but in reality, such a wave pattern includes the harmonic, which also causes distortion in the induced voltage generated by the rotation of the permanent magnet. Similarly, the d-axis inductance and the q-axis inductance also include the harmonic. It is known that such harmonic causes torque ripple. For example, when vector control is performed such that the d-axis current and the q-axis current stay constant, if the magnetic flux distribution of the magnet and the inductance distribution do not contain any harmonic, the torque generated at the motor becomes constant. However, in reality they generally contain the harmonic and thus the generated torque pulsates.

Figure 4:
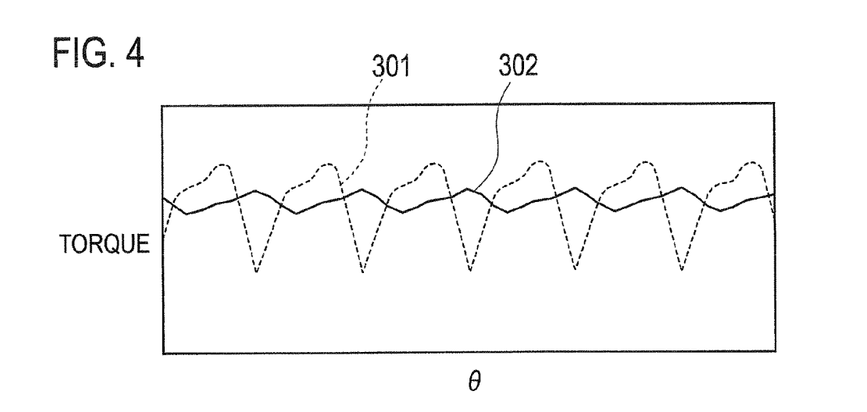
FIG. 4 is a figure showing a wave pattern of torque actually generated at the motor and a wave pattern of estimated torque.

FIG. 4 shows a simulation result obtained by a finite element method (FEM) indicating a comparison between the torque which is assumed as actually generated at the motor 1 (which will be called actual torque below) and the torque $T_{eo}(θ)$ which is estimated by using the formula (A-1). In the simulations that correspond to FIG. 4 and FIGS. 7 to 9 that will be described below, vector control is performed aiming at causing the motor 1 to generate certain torque by the motor control device 3. In addition, a three-phase AC voltage is applied to the armature winding such that when the time or the magnetic pole position θ is taken as the horizontal axis, the current of each armature winding has a sinusoidal wave pattern.

In the graph of FIG. 4, the horizontal axis corresponds to the magnetic pole position θ and the vertical axis corresponds to the torque. The wave pattern in broken line 301 is a wave pattern of the actual torque. While the vector control is performed aiming at generating constant torque, the torque ripple (torque fluctuation) occurs in the actual torque due to an involvement of the aforementioned harmonic with the motor 1. The wave pattern in solid line 302 is a wave pattern of the estimated torque $T_{eo}(\theta)$.

When focusing on a certain suitable interval, the interval average of the actual torque indicated by the wave pattern 301 and interval average of the estimated torque $T_{eo}(\theta)$ indicated by the wave pattern 302 are roughly identical, and it can be seen that the average torque is estimated well by the formula (A-1). However, as can be seen in FIG. 4, the ripple component contained in the estimated torque $T_{eo}(\theta)$ is much smaller than the ripple component of the actual torque. In other words, the torque fluctuation component cannot be estimated well by being based only on the formula (A-1).

The torque $T(\theta)$ generated at the motor 1 which include the torque fluctuation component is shown by the formula (A-4). The torque $T(\theta)$ corresponds to the actual torque shown by the wave pattern 301. At the right side member of the formula (A-4), $T_{eo}(\theta)$ is the torque estimated according to the above formula (A-1), and $T_{ripple}(\theta)$ is the torque fluctuation component (torque fluctuation component generated at the motor 1), and $T_{cogging}(\theta)$ is cogging torque. However, since the $T_{cogging}(\theta)$ is small compared with the $T_{eo}(\theta)$ and the $T_{ripple}(\theta)$, the $T_{cogging}(\theta)$ will be ignored in the explanation below.

$$T(\theta)=T_{eo}(\theta)+T_{ripple}(\theta)+T_{cogging}(\theta) \tag{A-4}$$

To distinguish the torque $T(\theta)$ which corresponds to the sum of the $T_{eo}(\theta)$ and the $T_{ripple}(\theta)$ from the torque $T_{eo}(\theta)$, the former torque also will be called corrected torque and the latter torque also will be called basic torque.

In this embodiment, the $T_{ripple}(\theta)$ is estimated by using inner product information of the flux-linkage vector and the current vector. In particular, the $T_{ripple}(\theta)$ is estimated by utilizing the formula (A-5) below. In other words, the $T_{ripple}(\theta)$ is estimated by differentiating the inner product of the flux-linkage vector and the current vector with respect to the magnetic pole position $\theta$. Alternatively, the $T_{ripple}(\theta)$ also can be estimated by utilizing the formula (A-6) below. When the formula (A-6) is utilized, the $T_{ripple}(\theta)$ is estimated by obtaining a differential flux-linkage vector by respectively differentiating the d-axis component and the q-axis component of the flux-linkage vector with respect to the magnetic pole position $\theta$, and obtaining an inner product of the differential flux-linkage vector and the current vector. The differential flux-linkage vector is a vector having $dF_q/d\theta$ and $dF_d/d\theta$ as the q-axis and d-axis components.

$$T_{ripple}(\theta) = P_n \frac{d\left(\frac{1}{2}(\phi_d i_d + \phi_q i_q)\right)}{d\theta} \tag{A-5}$$

$$T_{ripple}(\theta) = P_n \left( \frac{1}{2} i_q \frac{d\phi_q}{d\theta} + \frac{1}{2} i_d \frac{d\phi_d}{d\theta} \right) \tag{A-6}$$

That the torque fluctuation component can be expressed by these formulas will be explained in detail by using mathematical expressions. First, magnetic coenergy $W_m'$ is expressed by formula (A-7). The $W_m'$ at the formula (A-7) is magnetic coenergy when the d-axis current and the q-axis current take the current values respectively as indicated by $i_d$ and $i_q$. Considering that each of $F_q$ and $F_d$ are functions having the d-axis current, the q-axis current, and the magnetic pole position as the parameters, the $F_q$ and the $F_d$ are respectively shown as $F_q(0, i_q', \theta)$ and $F_d(i_d', i_q', \theta)$ in the formulas in which the $F_q$ and the $F_d$ are integrated, including the formula (A-7). The same thing applies to $L_q(0, i_q', \theta)$ and $L_d(i_d', i_q', \theta)$, which will be shown below.

$$W_m' = \int_0^{i_q} \phi_q(0, i_q', \theta) di_q' + \int_0^{i_d} \phi_d(i_d', i_q, \theta) di_d' \tag{A-7}$$

Figure 5A:
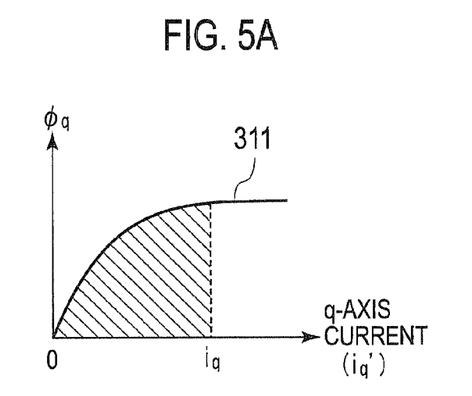
FIGS. 5A and 5B are image diagrams for explaining significance of magnetic coenergy.
Figure 5B:
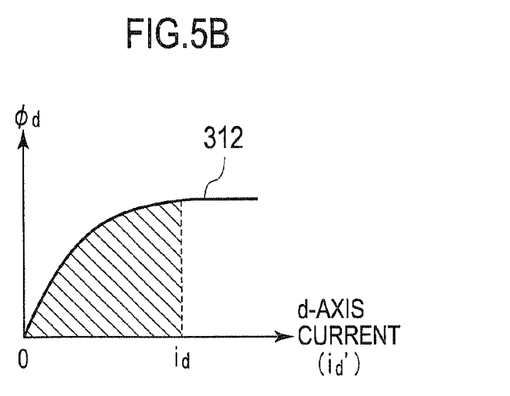

The $F_q(0, i_q', \theta)$ indicates the q-axis magnetic flux $F_q$ when the d-axis current, the q-axis current, and the magnetic pole position are 0, $i_q'$, and $\theta$ respectively, while the $F_d$ indicates the d-axis magnetic flux $F_d$ when the d-axis current, the q-axis current, and the magnetic pole position are $i_d'$, $i_q$, and $\theta$ respectively. The same thing applies to the $L_q(0, i_q', \theta)$ and the $L_d(i_d', i_q, \theta)$, which will be shown below. The first term at the right side member of the formula (A-7) is equal to the square measure of the shaded area of FIG. 5A, and it is an integral of the function $F_q(0, i_q', \theta)$ from 0 to $i_q$ while treating the q-axis current as a parameter. The second term at the right side member of the formula (A-7) is equal to the square measure of the shaded area of FIG. 5B, and it is an integral of the function $F_d(i_d', i_q, \theta)$ from 0 to $i_d$ while treating the d-axis current as a parameter. Curved lines 311 and 312 in FIGS. 5A and 5B are the curves showing magnetization characteristics of the motor 1 when the magnetic flux of the magnet is ignored.

The magnetic coenergy $W_m'$ is a function of the d-axis current, the q-axis current, and the magnetic pole position. Therefore, the total differential $dW_m'$ of the magnetic coenergy $W_m'$ can be shown as in the following formula, from which formula (A-8) is derived.

$$dW_m' = \frac{\partial W_m'}{\partial \theta} d\theta + \frac{\partial W_m'}{\partial i} di \tag{A-8}$$

$$\frac{dW_m'}{d\theta} = \frac{\partial W_m'}{\partial \theta} + \frac{\partial W_m'}{\partial i} \frac{di}{d\theta}$$

On the other hand, generated torque of the motor 1 can be obtained by partially differentiating the magnetic coenergy by the magnetic pole position. In other words, when the generated torque of the motor 1 is T, the torque T can be expressed by formula (A-9).

$$T = P_n \frac{\partial W_m'}{\partial \theta} \tag{A-9}$$

When assigning the formulas (A-7) and (A-8) to the formula (A-9) and clean it up, formula (A-10) can be obtained.

$$T = P_n \left( \frac{dW_m'}{d\theta} - \frac{\partial W_m'}{\partial i} \frac{di}{d\theta} \right) \tag{A-10}$$

$$= P_n \left( \frac{dW_m'}{d\theta} - \frac{\partial \left( \int_0^{i_q} \phi_q(0, i_q', \theta) di_q' + \int_0^{i_d} \phi_d(i_d', i_q, \theta) di_d' \right)}{\partial i} \frac{di}{d\theta} \right)$$

$$= P_n \left( \frac{dW_m'}{d\theta} - \left( \phi_q \frac{di_q}{d\theta} + \phi_d \frac{di_d}{d\theta} \right) \right)$$

$$= P_n \left( \frac{dW_m'}{d\theta} + (\phi_d i_q - \phi_q i_d) \right)$$

In the computation formula (A-10) of the generated torque T of the motor 1 derived from the formulas (A-7) to (A-9) that are naturally established, the second term at the right side member of the formula (A-10), that is $P_n(F_d i_q - F_q i_d)$, is the basic torque $T_{eo}(\theta)$ according to the formula (A-1) itself. Therefore, from the formula (A-4), it can be said that the first term at the right side member of the formula (A-10) corresponds to the torque fluctuation component. Thus, this term further will be studied by replacing the first term at the right side member of the formula (A-10) with the $T_{ripple}(\theta)$. When assigning the formula (A-7) to the first term at the right side member of the formula (A-10), formula (A-11) can be obtained.

$$T_{ripple}(\theta) = P_n \frac{d\left( \int_0^{i_q} \phi_q(0, i'_q, \theta) di'_q + \int_0^{i_d} \phi_d(i'_d, i_q, \theta) di'_d \right)}{d\theta} \quad (A\text{-}11)$$

Figure 6A:
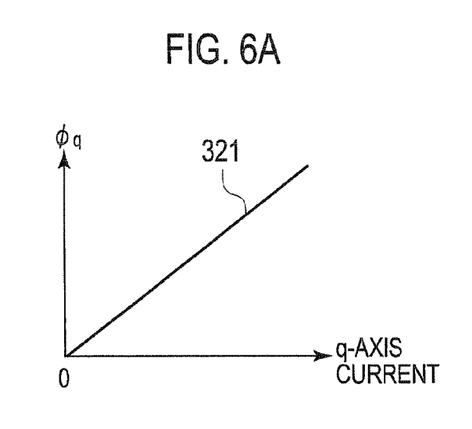
FIGS. 6A and 6B are figures showing magnetization properties of the motor when assuming that there is no influence of magnetic saturation.
Figure 6B:
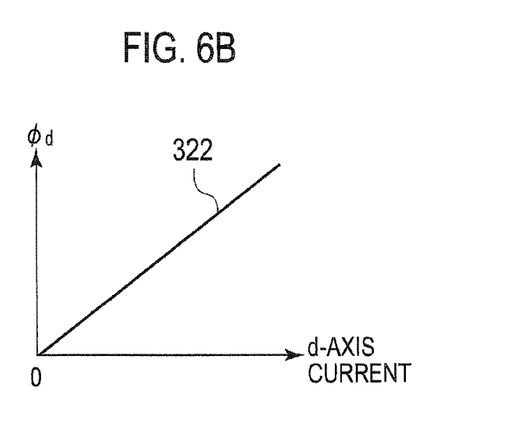

When using the relational expressions $F_q = L_q i_q$ and $F_d = L_d i_d$, the formula (A-11) is deformed into formula (A-12a). Moreover, it is assumed that magnetic saturation does not occur within the motor 1. This assumption is equal to approximating the true magnetic properties shown as curves 311 and 312 of FIGS. 5A and 5B by the magnetic properties shown as curves 321 and 322 of FIGS. 6A and 6B. By this assumption, the q-axis inductance $L_q$ does not depend on the q-axis current and the d-axis inductance $L_d$ does not depend on the d-axis current, and thus, the $L_q$ and the $L_d$ of the formula (A-12a) can be taken outside of the integral operation. In other words, the formula (A-12a) is deformed to formula (A-12b).

$$T_{ripple}(\theta) = P_n \frac{d\left( \int_0^{i_q} L_q(0, i'_q, \theta) i'_q di'_q + \int_0^{i_d} L_d(i'_d, i_q, \theta) i'_d di'_d \right)}{d\theta} \quad (A\text{-}12a)$$

$$T_{ripple}(\theta) = P_n \frac{d\left( L_q \int_0^{i_q} i'_q di'_q + L_d \int_0^{i_d} i'_d di'_d \right)}{d\theta} \quad (A\text{-}12b)$$

$$= P_n \frac{d\left( L_q \frac{1}{2} i_q^2 + L_d \frac{1}{2} i_d^2 \right)}{d\theta}$$

$$= P_n \left( \frac{1}{2} i_q^2 \frac{dL_q}{d\theta} + \frac{1}{2} i_d^2 \frac{dL_d}{d\theta} \right)$$

Moreover, when deforming the formula (A-12b) by using the relational expressions $F_q = L_q i_q$ and $F_d = L_d i_d$, formula (A-13) is derived. The formula obtained by assigning the relational expressions: $F_q = L_q i_q$ and $F_d = L_d i_d$ to the formula (A-12b) is the above formula (A-5), and the formula (A-13) is the same formula as the above formula (A-6). In other words, it was shown that it is possible to estimate the torque fluctuation component by the above formulas (A-5) and (A-6).

$$T_{ripple}(\theta) = P_n \left( \frac{1}{2} i_q^2 \frac{dL_q}{d\theta} + \frac{1}{2} i_d^2 \frac{dL_d}{d\theta} \right) \quad (A\text{-}13)$$

$$= P_n \left( \frac{1}{2} i_q \frac{d\phi_q}{d\theta} + \frac{1}{2} i_d \frac{d\phi_d}{d\theta} \right)$$

Also, the generated torque T (that is, the corrected torque) can be estimated according the formula (A-14) which can be obtained by assigning the formula (A-12b) to the first term of the right side member of the formula (A-10), or formula (A-15) which can be obtained by assigning the formula (A-13) to the first term of the right side member of the formula (A-10). The torque T computed according to the formula (A-14) or (A-15) ideally coincides with the actual torque.

$$T = P_n \left( \left( \frac{1}{2} i_q^2 \frac{dL_q}{d\theta} + \frac{1}{2} i_d^2 \frac{dL_d}{d\theta} \right) + (\phi_d i_q - \phi_q i_d) \right) \quad (A\text{-}14)$$

$$T = P_n \left( \left( \frac{1}{2} i_q \frac{d\phi_q}{d\theta} + \frac{1}{2} i_d \frac{d\phi_d}{d\theta} \right) + (\phi_d i_q - \phi_q i_d) \right) \quad (A\text{-}15)$$

In the deformation processes of the aforementioned formulas, the relational expression: $F_d = L_d i_d$ was used, but in a precise sense it is $F_d = L_d i_d + F_a$ (as described above, the $F_a$ is the armature flux-linkage by the permanent magnet 1*m*). In other words, when deriving the formulas (A-12a), (A-12b), or (A-13) from the formula (A-11), the term corresponding to the $F_a$ is ignored. It may seem that the torque estimation may contain an error as much as such term is ignored. However, in reality, when estimating the torque fluctuation component $T_{ripple}(\theta)$ by using the formula (A-5) or (A-6), the flux-linkage ($F_d$ or $F_q$) within the formula (A-5) or (A-6) is estimated by using the formulas (A-2) and (A-3), and influence of the $F_a$ is considered in the estimated flux-linkage ($F_d$ or $F_q$). Therefore, adverse effect from using the relational expression: $F_d = L_d i_d$ in the deformation processes of the aforementioned formulas is sufficiently small.

Figure 7:
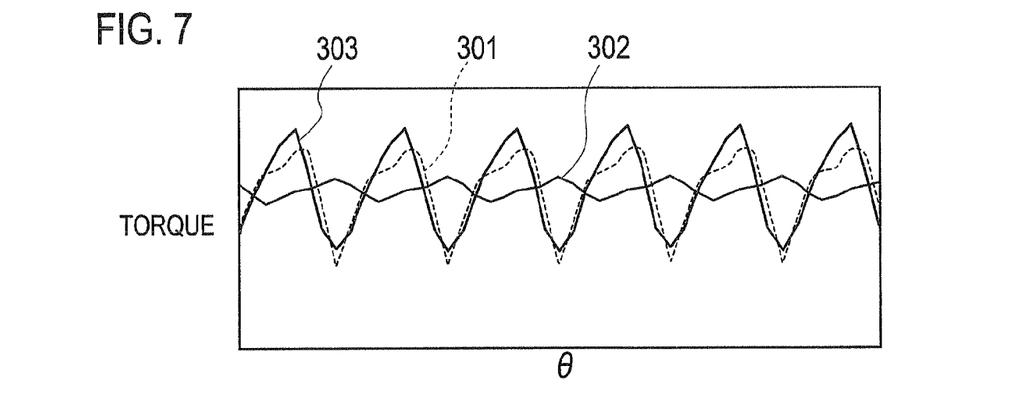
FIG. 7 is a figure showing a wave pattern of torque actually generated at the motor, and a wave pattern of torque (corrected torque) estimated by using inner product information of a flux-linkage vector and a current vector.
Figure 8:
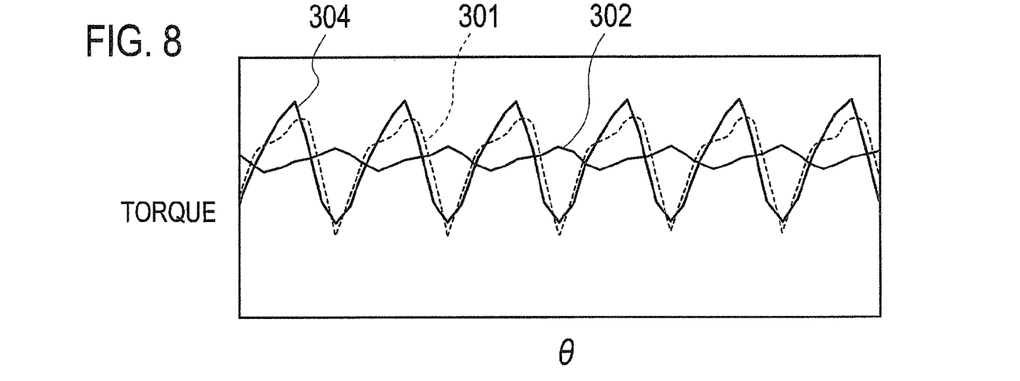
FIG. 8 is a figure showing a wave pattern of torque actually generated at the motor, and a wave pattern of torque (corrected torque) estimated by using inner product information of a flux-linkage vector and a current vector.

FIG. 7 shows an experimental result using a simulation, which indicates a comparison result of the actual torque and the corrected torque $T(\theta)$ estimated by using the formula (A-5). FIG. 8 shows an experimental result using a simulation, which indicates a comparison result of the actual torque and the corrected torque $T(\theta)$ estimated by using the formula (A-6). In each graph of FIG. 7 and FIG. 8, the horizontal axis corresponds to the magnetic pole position $\theta$, and the vertical axis corresponds to the torque. In FIGS. 7 and 8, wave patterns 301 and 302 are a wave pattern of the actual torque and a wave pattern of the basic torque $T_{eo}(\theta)$ according to the formula (A-1), which are similar to those shown in FIG. 4.

A wave pattern in solid line 303 of FIG. 7 is a wave pattern of corrected torque $T(\theta)$ ($=T_{eo}(\theta)+T_{ripple}(\theta)$) estimated according to the formulas (A-1), (A-4), and (A-5), and a wave pattern in solid line 304 of FIG. 8 is a wave pattern of corrected torque $T(\theta)$ ($=T_{eo}(\theta)+T_{ripple}(\theta)$) estimated according to the formulas (A-1), (A-4), and (A-6). It can be seen that an instantaneous value of the generated torque can be estimated accurately by further estimating the torque fluctuation component by using the formula (A-5) or the formula (A-6).

[Second Torque Estimation Method]

Next, the second torque estimation method will be explained. Now it is assumed that the magnetic pole position $\theta$ is changed from $\theta_1$ to $\theta_2$ by applying external force corresponding to the torque T to the rotor 1*r* while supplying a constant current i to the motor 1 during a very small amount of time dt. The tiny variation amount of the magnetic pole position $\theta$ from $\theta_1$ to $\theta_2$ is shown as $d\theta$.

Energy change associated with the motor 1 at the time when the magnetic pole position $\theta$ is changed by the tiny variation amount $d\theta$ is expressed by formula (B-1) using electric energy change $dW_E$, mechanical energy change $dW_M$, and magnetic energy change $dW_m$. Moreover, the electric energy change $dW_E$ and the mechanical energy change $dW_M$ are shown as in the formulas (B-2) and (B-3) below.

$$dW_E = dW_M + dW_m \quad \text{(B-1)}$$

$$dW_E = ivdt = i\frac{d\phi}{dt}dt = id\phi \quad \text{(B-2)}$$

$$dW_M = Td\theta_m \quad \text{(B-3)}$$

Here, $\theta_m$ is a magnetic pole position of the rotor $1r$ expressed in mechanical angle. Therefore, among the magnetic pole position $\theta_m$ expressed in mechanical angle, the magnetic pole position $\theta$ expressed in electric angle, and the paired number of poles $P_n$, the relational expression "$\theta = P_n \theta_m$" is established and the relational expression "$d\theta = P_n d\theta_m$" also is established.

On the other hand, the magnetic coenergy $W_m{}'$ is defined as in formula (B-4) below by using the magnetic energy $W_m$. When totally differentiating this formula (B-4), formula (B-5) can be obtained.

$$W_m + W_m{}' = i\phi \quad \text{(B-4)}$$

$$dW_m + dW_m{}' = id\phi + \phi di \quad \text{(B-5)}$$

When assigning the formulas (B-2), (B-3), and (B-5) in the formula (B-1), following formula (B-6) can be obtained.

$$Td\theta_m = (id\phi + \phi di - dW_m{}') - id\phi = \phi di - dW_m{}' \quad \text{(B-6)}$$

Here, it is assumed that the magnetic circuit formed within the motor 1 is a linear circuit. In other words, it is approximated such that following formula (B-7) is established. Then, the formula (B-6) can be deformed to formula (B-8).

$$\phi di = id\phi = ivdt \quad \text{(B-7)}$$

$$Td\theta_m = ivdt - dW_m{}' \quad \text{(B-8)}$$

When dividing the electric power iv in the formula (B-8) by rotation speed in mechanical angle $\omega_m$, following formula (B-9) can be obtained. The rotation speed expressed by the $\omega_m$ is angular speed of the rotor $1r$ expressed in mechanical angle. Therefore, among the rotation speed $\omega_m$ in mechanical angle, the rotation speed $\omega$ in electric angle, and the paired number of poles $P_n$, the relational expression "$\omega = P_n \omega_m$" is established and the relational expression "$d\omega = P_n d\omega_m$" also is established. When obtaining the formula (B-9) from the formula (B-8), the relational expression "$\omega_m = d\theta_m/dt = (1/P_n) \times (d\theta/dt)$" is used.

$$\frac{iv}{\omega_m} = \left(\frac{Td\theta_m}{dt} + \frac{dW_m{}'}{dt}\right)\frac{1}{\omega_m} \quad \text{(B-9)}$$

$$= \left(\frac{Td\theta_m}{dt} + \frac{dW_m{}'}{dt}\right)\frac{dt}{d\theta_m}$$

$$= T + \frac{dW_m{}'}{d\theta_m}$$

$$= T + \frac{dW_m{}'}{d\theta}\frac{d\theta}{d\theta_m}$$

$$T + \frac{dW_m{}'}{d\theta}P_n$$

Now, estimating torque of a motor based on input electric power to the motor has been conventionally performed, and in such a conventional torque estimation method using the electric power information, the torque is estimated by dividing the input electric power iv by the mechanical angular speed $\omega_m$. In other words, in the conventional torque estimation method, $iv/\omega_m$ is estimated as the torque (in addition, in a precise sense, division of the input electric power iv from which copper loss ($i^2 R_a$) is subtracted by the mechanical angular speed $\omega_m$ is estimated as the conventional estimated torque). However, as can be seen from the above formula (B-9), the torque T does not coincide with the $iv/\omega_m$ and accurate torque estimation cannot be performed unless the term of the $dW_m{}'/d\theta$ is considered.

Therefore, in order to perform accurate torque estimation, it is necessary that following formula (B-10) which corresponds to a deformed formula of the formula (B-9) be used (in other words, it is necessary that the first term at the right side member of the formula (A-10) described in the first torque estimation method is subtracted from the $iv/\omega_m$). In the formula (B-10), loss (so-called copper loss) occurred at the armature winding is ignored, but if that is to be considered, following formula (B-11) can be used.

$$T = \frac{iv}{\omega_m} - P_n \frac{dW_m{}'}{d\theta} \quad \text{(B-10)}$$

$$T = \frac{iv - i^2 R_a}{\omega_m} - P_n \frac{dW_m{}'}{d\theta} \quad \text{(B-11)}$$

On the other hand, when using the relational expressions "$F_d = L_d i_d + F_a$ and $F_q = L_q i_q$", the formula (A-10) described in the first torque estimation method can be deformed as following formula (B-12).

$$T = P_n \left(\frac{dW_m{}'}{d\theta} - \frac{\partial W_m{}'}{\partial i}\frac{di}{d\theta}\right) \quad \text{(B-12)}$$

$$= P_n \left(\frac{dW_m{}'}{d\theta} + (\phi_d i_q - \phi_q i_d)\right)$$

$$= P_n \left(\frac{dW_m{}'}{d\theta} + (\phi_a i_q + (L_d - L_q) i_d i_q)\right)$$

From the formula (B-10) and the formula (B-12), following formula (B-13) can be obtained, and from the formula (B-11) and the formula (B-12), following formula (B-14) can be obtained. As such, it can be seen that the torque fluctuation component ($P_n \cdot dW_m{}'/d\theta$), which corresponds to the first term at the right side member of the formula (A-10) described in the first torque estimation method, can be computed based on the input electric power iv to the motor 1 for rotationally driving the rotor $1r$, the rotation speed $\omega_m$, and an exterior product of the flux-linkage vector F and the current vector i.

$$P_n = \frac{dW_m{}'}{d\theta} \quad \text{(B-13)}$$

$$= \frac{1}{2}\left(\frac{iv}{\omega_m} - P_n(\phi_d i_q - \phi_q i_d)\right)$$

$$= \frac{1}{2}\left(\frac{iv}{\omega_m} - P_n(\phi_a i_q + (L_d - L_q) i_d i_q)\right)$$

$$P_n \frac{dW_m{}'}{d\theta} = \frac{1}{2}\left(\frac{iv - i^2 R_a}{\omega_m} - P_n(\phi_d i_q - \phi_q i_d)\right) \quad \text{(B-14)}$$

$$= \frac{1}{2}\left(\frac{iv - i^2 R_a}{\omega_m} - P_n(\phi_a i_q + (L_d - L_q) i_d i_q)\right)$$

Moreover, by using following formula (B-15), which is obtained by assigning the formula (B-13) to the formula (B-10), the corrected torque T including the torque fluctuation component can be estimated. When considering the loss occurred at the armature winding, the corrected torque T including the torque fluctuation component can be estimated by using following formula (B-16), which is obtained by assigning the formula (B-14) to the formula (B-10).

$$T = \frac{1}{2}\left(\frac{iv}{\omega_m} + P_n(\phi_d i_q - \phi_q i_d)\right) \quad \text{(B-15)}$$

$$= \frac{1}{2}\left(\frac{iv}{\omega_m} + P_n(\phi_a i_q + (L_d - L_q)i_d i_q)\right)$$

$$T = \frac{1}{2}\left(\frac{iv - i^2 R_a}{\omega_m} + P_n(\phi_d i_q - \phi_q i_d)\right) \quad \text{(B-16)}$$

$$= \frac{1}{2}\left(\frac{iv - i^2 R_a}{\omega_m} + P_n(\phi_a i_q + (L_d - L_q)i_d i_q)\right)$$

In addition, while in the explanation of the above first torque estimation method, the corrected torque sometimes was expressed by the symbol $T(\theta)$ in order to express clearly that the corrected torque is a function of the magnetic pole position $\theta$, but in the explanation of the second torque estimation method, the corrected torque is simply expressed by T.

Figure 9:
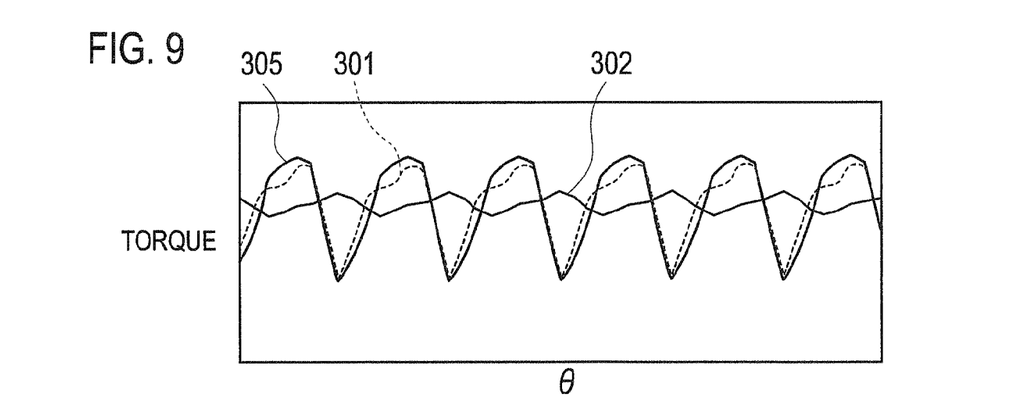
FIG. 9 is a figure showing a wave pattern of torque actually generated at the motor, and a wave pattern of torque (corrected torque) estimated by using electric power information.

FIG. 9 shows an experimental result using a simulation, which indicates a comparison result of the actual torque and the corrected torque estimated by using the formula (B-16). In the graph of FIG. 9, the horizontal axis corresponds to the magnetic pole position $\theta$, and the vertical axis corresponds to the torque. In FIG. 9, wave patterns 301 and 302 are a wave pattern of the actual torque and a wave pattern of the basic torque $T_{eo}(\theta)$ according to the formula (A-1), which are similar to those shown in FIG. 4. A wave pattern in solid line 305 of FIG. 9 is a wave pattern of corrected torque T estimated according to the formula (B-16). By estimating the torque in further consideration of the torque fluctuation component according to the formula (B-16), it can be seen that an instantaneous value of the generated torque can be estimated accurately. At this time, unlike in the case of using such as the above formula (A-5) concerning the first torque estimation method, there is an advantage that computation errors can be reduced because it is not necessary to use differential information of the armature flux-linkage.

In the above explanation of the first and second torque estimation methods, formulas that focus on the dq coordinate system were described. However, it is possible to perform torque estimation by using a formula that focuses on the $\alpha\beta$ coordinate system. In other words, for example the $F_d$, $F_q$, $i_d$, and $i_q$ in the above formula (A-5) can be substituted respectively with Fa, F$\beta$, ia, and i$\beta$. The same holds for other formulas including the formulas (A-6), and (B-13) to (B-16).

As examples utilizing the first and second torque estimation methods, the first and second embodiments will be illustrated below. The above-described contents are applicable to the first and second embodiments unless they are contradictory.

<<First Embodiment>>

Figures 10, 11:
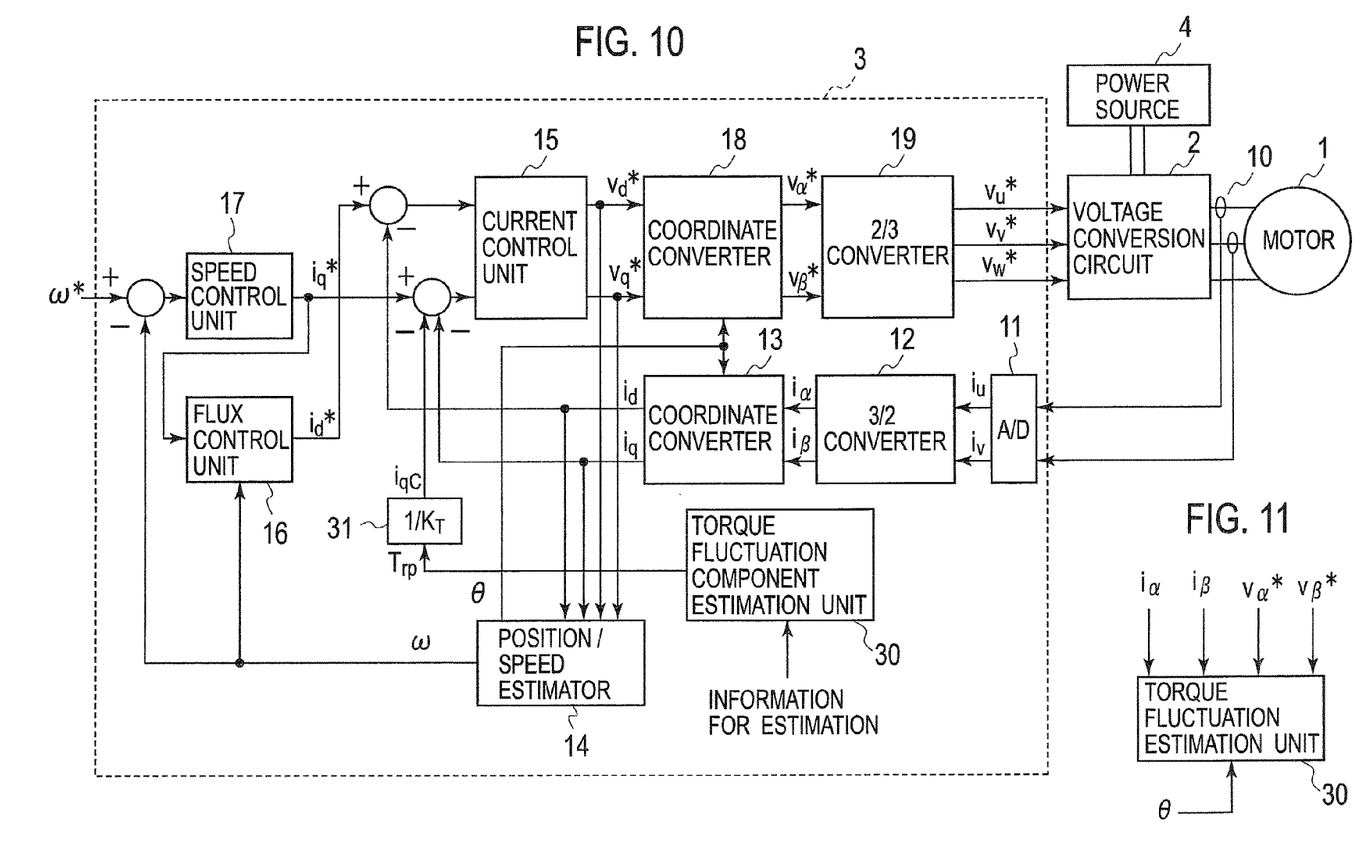
FIG. 10 is a detailed block diagram of the motor drive system according to the first embodiment of the invention.
FIG. 11 is a figure showing a condition in which information is entered in the torque fluctuation component estimation unit of FIG. 10.

Now the first embodiment will be explained. FIG. 10 is a detailed block diagram of the motor drive system according to the first embodiment. The motor drive system of FIG. 10 includes the motor 1, the voltage conversion circuit 2, and the motor control device 3 of FIG. 1, and a power source 4, and current sensors 10. The motor 1 for example is an interior permanent magnet synchronous motor. The motor control device of FIG. 10 includes each part being referred to by the numerical symbols 11 to 19, 30, and 31. The DC voltage from the power source 4 connected to the voltage conversion circuit 2 is converted to a three-phase AC voltage and is supplied to the motor 1.

Each part within the motor control device 3 can utilize freely each value generated within the motor control device 3. Each part that forms the motor control system of FIG. 10 updates at a predetermined cycle command values (including $\omega^*$, $i_d^*$, $i_q^*$, $v_d^*$, $v_q^*$, va*, v$\beta$*, $v_u^*$, $v_v^*$ and $v_w^*$) or state quantities (including $i_u$, $i_v$, ia, i$\beta$, $i_d$, $i_q$, $\theta$, $\omega$, $T_{rp}$, and $i_{qC}$) that it computes (or detects) and outputs, and carries out an operation of each value according to the updated command values and state values.

In the motor drive system of FIG. 10, the motor current i is broken down to the d-axis current $i_d$ which is the excitation current component, and the q-axis current $i_q$ which is the torque current component, and vector control is performed such that they follow the current command values. Functions of each part in FIG. 10 will be explained more specifically.

The current sensors 10 output analog signals indicating current values of the U-phase current $i_u$ and the V-phase current $i_v$ that are supplied to the motor 1 from the voltage conversion circuit 2. A current detection unit 11 detects the U-phase current $i_u$ and the V-phase current $i_v$ based on the output signals from the current sensors 10. More specifically, for example, the current detection unit 11 is an A/D converter that converts analog signals from the current sensors 10 to digital signals. The current value of the W-phase current $i_w$ is computed from the relational expression "$i_w = -i_u - i_v$" utilizing the detected current values $i_u$ and $i_v$.

A 3/2 converter 12 computes and outputs the a-axis current value ia and the $\beta$-axis current value i$\beta$ by coordinate converting the U-phase current $i_u$ and the V-phase current $i_v$ onto the a$\beta$ axes. A coordinate converter 13 computes and outputs the d-axis current value $i_d$ and the q-axis current value $i_q$ by coordinate converting the a-axis current value ia and the $\beta$-axis current value i$\beta$ onto the dq axes based on the estimated magnetic pole position $\theta$. The rotation speed $\omega$ and the magnetic pole position $\theta$ are estimated and outputted by a position/speed estimator 14. In this embodiment (and the second embodiment which will be described below), the estimated rotation speed and the estimated magnetic pole position respectively mean the rotation speed and the magnetic pole position estimated by the position/speed estimator 14.

A speed command generator, not shown, generates a rotation speed command value $\omega^*$ for rotating the rotor of the motor 1 at desired rotation speed (electric angular speed). The difference between the rotation speed command value $\omega^*$ and the estimated rotation speed $\omega$ is given to a speed control unit 17.

The speed control unit 17 computes and outputs a q-axis current command value $i_q^*$ such that the velocity deviation ($\omega^* - \omega$) converges to zero by utilizing for example proportional-integral control. The $i_q^*$ is a target value for the q-axis current value $i_q$ that the $i_q$ is to follow.

A flux control unit 16 computes and outputs a d-axis current command value $i_d^*$. The $i_d^*$ is a target value for the d-axis current value $i_d$ that the $i_d$ is to follow. The $i_d^*$ may take various values depending on the kind of vector control carried out at the motor drive system and the rotation speed. For example, when performing the control to make the d-axis current zero, it is made such that the $i_d^* = 0$. Moreover, when the maximum torque per ampere control and flux-weakening control are performed, the $i_d^*$ takes a negative value according to the estimated rotation speed $\omega$. In addition, the $i_q^*$ also is referred to in computing the $i_d^*$ when needed.

A torque fluctuation component estimation unit 30 estimates the torque fluctuation component based on information for estimation including the values computed within the motor control device 3 utilizing the above-described first and second torque estimation methods. The torque fluctuation component estimated by the torque fluctuation component estimation unit 30 is expressed by $T_{rp}$ and is also called the estimated torque fluctuation component. A specific computation method for the estimated torque fluctuation component $T_{rp}$ will be described below.

A torque/current conversion unit 31 converts the estimated torque fluctuation component $T_{rp}$ to current information by using the torque constant $K_T$. More specifically, a q-axis current correction value $i_{qC}$ is computed by dividing the estimated torque fluctuation component $T_{rp}$ by the torque constant $K_T$. The torque constant $K_T$ is predetermined according to the characteristics of the motor 1.

A current control unit 15 performs current feedback control such that the current error $(i_d{}^*-i_d)$ obtained by subtracting the d-axis current value $i_d$ from the d-axis current command value $i_d{}^*$, and the current error $(i_q{}^*-i_q-i_{qC})$ obtained by subtracting the q-axis current value $i_q$ and the q-axis current correction value $i_{qC}$ from the q-axis current command value $i_q{}^*$, both converge to zero by utilizing for example the proportional-integral control. At this time, the d-axis voltage command value $v_d{}^*$ and the q-axis voltage command value $v_q{}^*$ are computed such that $(i_d{}^*-i_d)$ and $(i_q{}^*-i_q-i_{qC})$ both converge to zero by utilizing noninteracting control for eliminating the interaction between the d-axis and the q-axis. The $v_d{}^*$ indicates a target value for the $v_d$ that the d-axis voltage value $v_d$ is to follow, and the $v_q{}^*$ indicates a target value for the $v_q$ that the q-axis voltage value $v_q$ is to follow. In addition, in computing the $v_d{}^*$ and the $v_q{}^*$, the ω, the $i_d$, and the $i_q$ also can be referred to.

A coordinate converter 18 computes the a-axis voltage command value va* and the β-axis voltage command value iβ* by coordinate converting the $v_d{}^*$ and the $v_q{}^*$ onto the as axes based on the estimated magnetic pole position θ. The va* indicates a target value for the va that the a-axis voltage value va is to follow, and the vβ* indicates a target value for the vβ that the β-axis voltage value vβ is to follow.

A 2/3 converter 19 computes three-phase voltage command values by coordinate converting the as-axis voltage command values va* and iβ* onto the three-phase fixed coordinate axes. The three-phase voltage command values are composed of a U-phase voltage command value $v_u{}^*$, a V-phase voltage command value $v_v{}^*$, and a W-phase voltage command value $v_w{}^*$. The $v_u{}^*$, the $v_v{}^*$, and the $v_w{}^*$ respectively specify the voltage values for the $v_u$, the $v_v$, and the $v_w$. The voltage conversion circuit 2 supplies three-phase AC voltages to the three-phase armature winding such that the three-phase AC voltages make the current of each armature winding have a sinusoidal wave pattern when the time or the magnetic pole position θ is taken as the horizontal axis.

The position/speed estimator 14 can estimate the rotation speed ω and the magnetic pole position e by using an arbitrary method including a known method such as a method described in Japanese Patent No. 3411878. For example, it is possible to estimate the rotation speed ω and the magnetic pole position θ by using all or part of the $v_d{}^*$, the $v_q{}^*$, the $i_d$, and the $i_q$.

The q-axis current command value $i_q{}^*$ corresponds to a target value for the generated torque of the motor 1 which is expressed by a current value. In a conventional general motor drive system, vector control is performed such that the current error $(i_q{}^*-i_q)$ converges to zero, in which the $i_q$ follows the $i_q{}^*$. However, in such a method, the generated torque fluctuates periodically with respect to the target value due to the harmonic contained in the magnetic flux distribution of the magnet and the inductance distribution.

To restrain this fluctuation, in the motor drive system of FIG. 10, the q-axis current correction value $i_{qC}$ is used, which is a current converted value of the torque fluctuation component. In other words, the q-axis current value $i_q$, which is based on a detected value of the current sensor 10, is corrected by using the q-axis current correction value $i_{qC}$, and vector control is performed such that the value $(i_q+i_{qC})$ obtained by this correction follows the $i_q{}^*$ in order to restrain the fluctuation of the generated torque. As such, fluctuation of the generated torque of the motor 1 is restrained and thus, vibration and noise derived from such fluctuation can be restrained.

Now a computation method of the estimated torque fluctuation component $T_{rp}$ will be explained specifically. The estimated torque fluctuation component $T_{rp}$ at a given time is computed based on up-to-date state quantities and command values obtained at that time instant.

[First Computation Method of $T_{rp}$]

First, the instance in which the formula (A-5) described in the explanation of the first torque estimation method is utilized will be explained. In this case, the $T_{rp}$ can be computed according to following formulas (C-1) or (C-2) based on the ia, the iβ, the va*, and the vβ* that are given from the 3/2 converter 12 and the coordinate converter 18, and the θ (or the ω) that is given from the position/speed estimator 14 (see FIG. 11).

$$T_{rp} = P_n \frac{d\left(\frac{1}{2}(\phi_d i_d + \phi_q i_q)\right)}{d\theta} \quad \text{(C-1)}$$

$$T_{rp} = P_n \frac{d\left(\frac{1}{2}(\phi_\alpha i_\alpha + \phi_\beta i_\beta)\right)}{d\theta} \quad \text{(C-2)}$$

$$\phi_\alpha = \int (v_\alpha^* - R_a i_\alpha) dt + \phi_{\alpha|t=0} \quad \text{(C-3)}$$

$$\phi_\beta = \int (v_\beta^* - R_a i_\beta) dt + \phi_{\beta|t=0} \quad \text{(C-4)}$$

The Fa and the Fβ in the formula (C-2) can be obtained according to the formulas (C-3) and (C-4). By coordinate converting the Fa and the Fβ obtained according to the formulas (C-3) and (C-4) onto the dq axes, the $F_d$ and the $F_q$ in the formula (C-1) can be obtained. The integral at each right side member of the formulas (C-3) and (C-4) is the integral with respect to the time t, and when computing the present time $F_d$, $F_q$, Fa, and Fβ, their integral intervals are from the reference time $t_0$ to the present time. Also, each value for the $Fa_{|t=0}$ and the $F\beta_{|t=0}$ is known by the motor control device 3.

A specific computing method when using the formula (C-1) will be explained. In this case, the torque fluctuation component estimation unit 30 computes the $T_{rp}$ by differentiating the scalar quantity $(F_d i_d + F_q i_q)$ that indicates an inner product of the flux-linkage vector and the current vector with respect to the magnetic pole position θ. Each operation within the motor drive system is performed based on instantaneous values of a discretized command value and state quantity. Therefore, this differentiation in fact is carried out by a difference operation.

In other words, when using the formula (C-1), the torque fluctuation component estimation unit 30 successively computes the scalar quantity $(F_d i_d + F_q i_q)$ indicating the inner product of the flux-linkage vector and the current vector based on the latest interlinkage magnetic vector and current vector. And when the scalar quantities $(F_d i_d + F_q i_q)$ at time $t_1$ and $t_2$ are respectively $(F_d i_d + F_q i_q)_{t1}$ and $(F_d i_d + F_q i_q)_{t2}$, and the estimated magnetic pole positions θ at the time $t_1$ and $t_2$ are respectively $\theta_1$ and $\theta_2$, the $T_{rp}$ at the time $t_2$ is estimated and computed according to following formula (C-5). Here, the time $t_2$ is time when a very small amount of time dt has passed from the time $t_1$. Also, the time $t_1$ and $t_2$ are the time later than the reference time $t_0$.

$$T_{rp} = P_n \frac{\frac{1}{2}((\phi_d i_d + \phi_q i_q)_{t2} - (\phi_d i_d + \phi_q i_q)_{t1})}{\theta_2 - \theta_1} \quad \text{(C-5)}$$

Also, since the magnetic pole position θ changes from $\theta_1$ to $\theta_2$ due to the rotation of the rotor of the motor 1 as much as the very small amount of time dt, the tiny variation amount ($\theta_2 - \theta_1$) may be replaced by the product of the rotation speed and the very small amount of time dt ($\omega_{12} \times dt$). Here, the $\omega_{12}$ is estimated rotation speed ω at the time $t_1$ or estimated rotation speed ω at the time $t_2$, or an average value between the two, and $dt = t_2 - t_1$. In addition, since the ω and the ω* coincide (or generally coincide) in a steady state, the $\omega_{12}$ may be made as the ω* at the time $t_1$ or $t_2$. In either case of using ($\theta_2 - \theta_1$) or ($\omega_{12} \times dt$), the estimated torque fluctuation component $T_{rp}$ still is computed from the ratio of the tiny variation amount of the magnetic pole position and the tiny variation amount of the inner product value (the aforementioned scalar amount).

When computing the Fa according to the formula (C-3), the torque fluctuation component estimation unit 30 computes (va*−$R_a$ia) based on va* and ia that are successively computed at each discretized time in predetermined control cycle. The discretized time in the control cycle also will be called specifically discretized time. The above time $t_1$ and $t_2$ are discretized time. And for example the Fa at discretized time $t_1$ can be obtained by integrating the value for (va*−$R_a$ia) computed from a discretized time subsequent to the reference time $t_0$ to the discretized time $t_1$, and by adding Fa$|_{t=0}$ to such an integrated value. The same thing applies to the case of computing the Fβ based on the formula (C-4).

While the specific computation method when using the formula (C-1) was explained in detail, a similar operation can be carried out when using the formula (C-2) also (it is different only in that the coordinate axes being focused on are the dq axes or the αβ axes.

[Second Computation Method of $T_{rp}$]

Next, the case of using the formula (A-6) described in the explanation of the first torque estimation method will be explained. In this case, the torque fluctuation component estimation unit 30 can compute the $T_{rp}$ according to formula (C-6) or (C-7) based on the ia, the iβ, the va*, and the vβ* that are given from the 3/2 converter 12 and the coordinate converter 18, and the θ (or the ω) that is given from the position/speed estimator 14 (see FIG. 11).

$$T_{rp} = P_n \left( \frac{1}{2} i_q \frac{d\phi_q}{d\theta} + \frac{1}{2} i_d \frac{d\phi_d}{d\theta} \right) \quad \text{(C-6)}$$

$$T_{rp} = P_n \left( \frac{1}{2} i_\beta \frac{d\phi_\beta}{d\theta} + \frac{1}{2} i_\alpha \frac{d\phi_\alpha}{d\theta} \right) \quad \text{(C-7)}$$

The specific computation methods of the $F_d$, the $F_q$, the Fa, and the Fβ in the formula (C-6) or (C-7) are as described above.

A specific computation method when using the formula (C-6) will be explained. In this case, the torque fluctuation component estimation unit 30 computes differential information of the flux-linkage by differentiating the d-axis component and the q-axis component of the armature flux-linkage F with respect to the magnetic pole position θ. This differential information is vector information having the d-axis component ($dF_d/d\theta$) and the q-axis component ($dF_q/d\theta$), and the vector according to this differential information will be called a differential flux-linkage vector. Thereafter, an inner product of this differential flux-linkage vector and the current vector is obtained, and the $T_{rp}$ is computed by multiplying thus obtained inner product value by $P_n \times 1/2$.

As described above, each operation within the motor drive system is performed based on an instantaneous value of a discretized command value and state quantity. Therefore, the differentiation with respect to the magnetic pole position θ in fact is carried out by a difference operation. In other words, when using the formula (C-6), at each discretized time that successively arrives, the torque fluctuation component estimation unit 30 computes the Fa and the Fβ based on the latest ia, iβ, va*, and vβ*, as well as the $F_d$ and the $F_q$. And when the $F_d$ at the time (discretized time) $t_1$ and $t_2$ are respectively $F_{d1}$ and $F_{d2}$, and the $F_q$ at the time $t_1$ and $t_2$ are respectively $F_{q1}$ and $F_{q2}$, and further the estimated magnetic pole positions θ at the time $t_1$ and $t_2$ are respectively $\theta_1$ and $\theta_2$, ($dF_d/d\theta$) and ($dF_q/d\theta$) at the time $t_2$ can be computed according to the following formulas (C-8) and (C-9).

$$\frac{d\phi_d}{d\theta} = \frac{\phi_{d2} - \phi_{d1}}{\theta_2 - \theta_1} \quad \text{(C-8)}$$

$$\frac{d\phi_q}{d\theta} = \frac{\phi_{q2} - \phi_{q1}}{\theta_2 - \theta_1} \quad \text{(C-9)}$$

Thereafter, the $T_{rp}$ at the time $t_2$ is computed according to the formula (C-6) by using the ($dF_d/d\theta$) and ($dF_q/d\theta$) according to the formulas (C-8) and (C-9) and the $i_d$ and the $i_q$ at the time $t_2$.

As described in the explanation of the formula (C-5), the tiny variation amount of the magnetic pole position ($\theta_2 - \theta_1$) in the formula (C-8) or (C-9) may be replaced by a product of the rotation speed and the very small amount of time dt ($\omega_{12} \times dt$). In either case of using ($\theta_2 - \theta_1$) or ($\omega_{12} \times dt$), the differential information of the flux-linkage still is derived from the ratio of the tiny variation amount of the magnetic pole position and the tiny variation amount of the $F_d$ and the $F_q$. When utilizing the above-described difference operation, this differential information can be called difference information. The $T_{rp}$ is computed by an inner product of the differential flux-linkage vector indicated by this differential information (or the difference information).

While the specific computation method when utilizing the formula (C-6) was described in detail, similar operations are performed when utilizing the formula (C-7) also.

[Third Computation Method of $T_{rp}$]

Next, the case in which the formula (B-13) or the formula (B-14) described in the explanation of the second torque estimation method is utilized will be explained. In this case, the torque fluctuation component estimation unit 30 can compute the $T_{rp}$ according to one of the following formulas (C-10) to (C-15).

$$T_{rp} = \frac{1}{2} \left( \frac{iv}{\omega_m} - P_n (\phi_d i_q - \phi_q i_d) \right) \quad \text{(C-10)}$$

$$T_{rp} = \frac{1}{2} \left( \frac{iv}{\omega_m} - P_n (\phi_\alpha i_\beta - \phi_\beta i_\alpha) \right) \quad \text{(C-11)}$$

-continued $$T_{rp} = \frac{1}{2}\left(\frac{iv}{\omega_m} - P_n(\phi_a i_q + (L_d - L_q)i_d i_q)\right) \quad \text{(C-12)}$$

$$T_{rp} = \frac{1}{2}\left(\frac{iv - i^2 R_a}{\omega_m} - P_n(\phi_d i_q - \phi_q i_d)\right) \quad \text{(C-13)}$$

$$T_{rp} = \frac{1}{2}\left(\frac{iv - i^2 R_a}{\omega_m} - P_n(\phi_a i_\beta - \phi_\beta i_a)\right) \quad \text{(C-14)}$$

$$T_{rp} = \frac{1}{2}\left(\frac{iv - i^2 R_a}{\omega_m} - P_n(\phi_a i_q + (L_d - L_q)i_d i_q)\right) \quad \text{(C-15)}$$

Specific computation methods for the $F_d$, the $F_q$, the Fa and the Fβ in the formulas (C-10) to (C-15) are as described above. The $i_d$, $i_q$, the ia, and the iβ in the formulas (C-10) to (C-15) can be obtained from the 3/2 converter 12 and the coordinate converter 13, and the $\omega_m$ in the formulas (C-10) to (C-15) can be computed from the ω from the position/speed estimator 14 and the relational expression "ω=$P_n\omega_m$". Alternatively, since the ω follows the ω*, the $\omega_m$ as defined in "ω*=$P_n\omega_m$" may be used in computation of the formulas (C-10) to (C-15).

The iv in the formulas (C-10) to (C-15) is the input electric power from the power source 4 via the voltage conversion circuit 2, and is computed by an inner product of a current vector which is a vectorial representation of the motor current i and a voltage vector which is a vectorial representation of the motor voltage v. In reality, the iv is computed according to iv=$i_d \cdot v_d^* + i_q \cdot v_q^*$, or iv=ia·va*+iβm·vβ*, or iv=$i_u \cdot v_u + i_v \cdot v_v^* + i_w \cdot v_w^*$. The $i^2$ in the formulas (C-10) to (C-15) can be computed according to $i^2 = i_d^2 + i_q^2$, or $i^2 = ia^2 + i\beta^2$, or $i^2 = i_u^2 + i_v^2 + i_w^2$.

As described above, the $T_{rp}$ at a given time is computed based on the latest state quantities and command values available at that time. Therefore, for example, in a case that the $T_{rp}$ at the time $t_1$ is computed by utilizing the formula (C-10), the Fa and the Fβ are obtained by using the latest ia, iβ, va*, and vβ* available at that time $t_1$, as well as obtaining the $F_d$ and the $F_q$, and the $T_{rp}$ at the time $t_1$ is computed by using the obtained $F_d$ and $F_q$ and the latest $i_d$, $i_q$, $v_d^*$, $v_q^*$, and ω.

In the fraction at the first term of the right side member of the formula (C-13), (C-14) or (C-15), the numerator is what the copper loss $i^2 R_a$ is subtracted from the input electric power iv, but loss other than the copper loss such as iron loss may also be further considered. In other words, for example, the numerator of the fraction at the first term of the right side member of the formula (C-13), (C-14) or (C-15) may be changed from (iv−$i^2 R_a$) to (iv−$i^2 R_a$−LOSS). Here, the LOSS is a positive value indicating the loss other than the copper loss. The LOSS can be a preset fixed value or can be a function of such as the rotation speed (ω or ω*).

Second Embodiment

Figure 12:
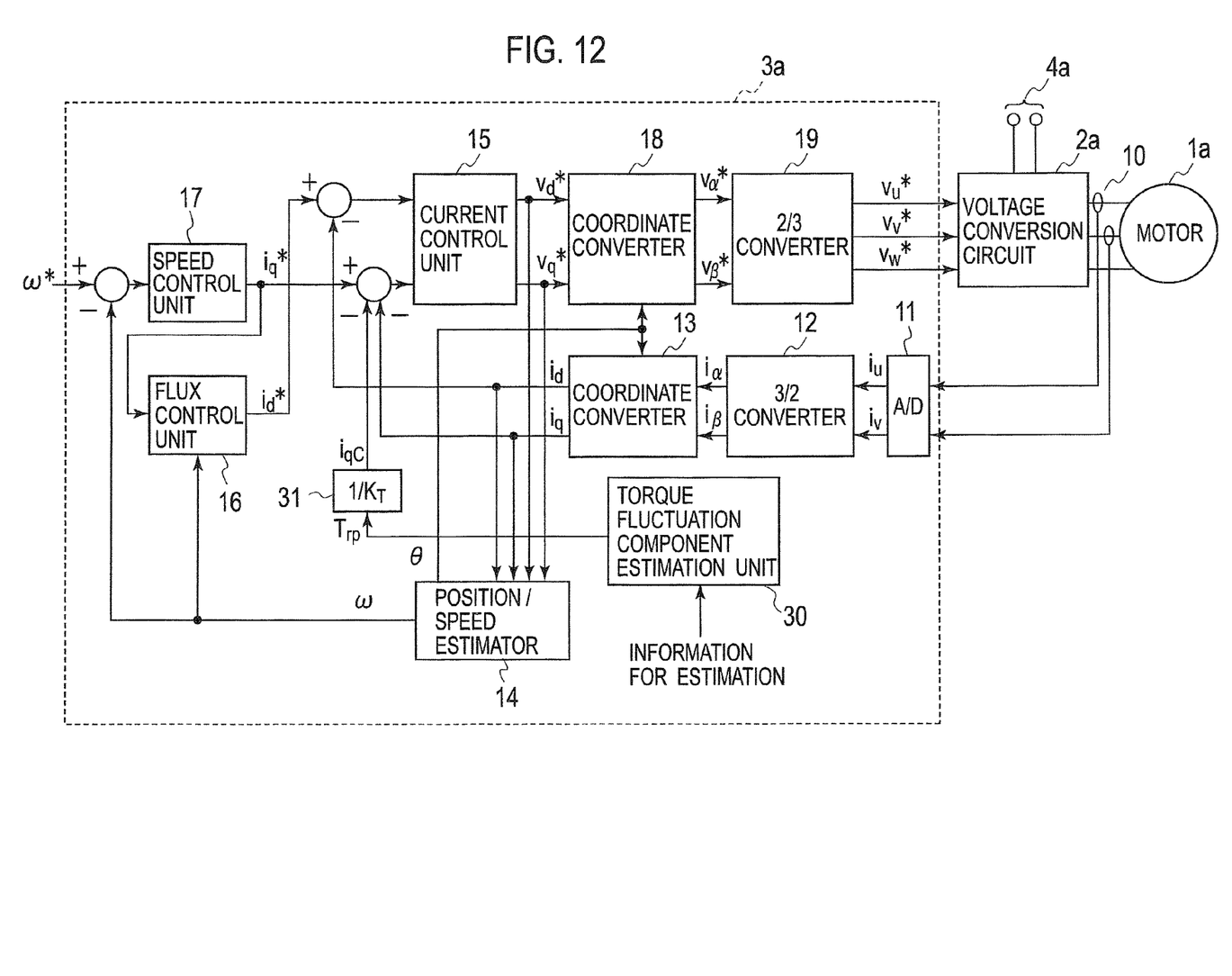
FIG. 12 is a detailed block diagram of the electric power generating system according to the second embodiment of the invention.

Next, the second embodiment will be explained. FIG. 12 is a detailed block diagram of the power generating system according to the second embodiment. The power generating system of FIG. 12 includes a generator 1a, a voltage conversion circuit 2a, and a generator control device 3a, as well as voltage output parts 4a and current sensors 10.

The generator 1a is a three-phase permanent magnet synchronous generator, such as an interior permanent magnet synchronous generator. The generator 1a includes a rotor provided with a permanent magnet, and a stator to which U-phase, V-phase, and W-phase armature winding is provided, and has a structure equivalent to that of the motor 1.

While the electric power provided from the power source 4 is converted to torque (rotative force) at the motor 1 in the motor drive system of FIG. 10, in the power generating system of FIG. 12 the torque generated at the generator 1a is converted to electric power. As such, the difference is only in that whether the electric power is converted to the torque or the torque is converted to the electric power, and the motor drive system of FIG. 10 and the power generating system have similar structures and functions in other respects. Therefore, the items (including the definitions for the terms and the symbols) explained with respect to the motor 1 and the motor drive system all apply to the power generating system of FIG. 12 also, unless they are contradictory.

However, since a generator is provided in the power generating system in place of the motor of the motor drive system, when applying the items explained with respect to the motor and the motor drive system in this embodiment, substitute reading that is derived from such difference of the terms (the difference in the term motor and the term generator) should be made. In other words, at the time of this application, first the "motor" in the above-described explanations should be read in substitution as the "generator" and the terms described with respect to the motor (including the permanent magnet, the armature winding, the paired number of poles, various state quantities and command values) should be interpreted as the terms described with respect to the generator in this embodiment.

Therefore, for example, in this embodiment, v indicates a generator voltage that corresponds to a combined voltage of the U-phase voltage $v_u$, the V-phase voltage $v_v$, and the W-phase voltage $v_w$ that are applied to the U-phase, V-phase, and W-phase armature winding at the generator 1a; i indicates a generator current (armature current of the generator) that corresponds to a combined current of the U-phase current $i_u$, the V-phase current $i_v$, and the W-phase current $i_w$ that flow in the U-phase, V-phase, and W-phase armature winding at the generator 1a; and F indicates a combined flux-linkage of the U-phase, V-phase, and W-phase armature winding at the generator 1a. Of course, for example the d-axis component, the q-axis component, the a-axis component, and the β-axis component of the generator voltage v respectively are indicated as $v_d$, $v_q$, va, and vβ. Also, in this embodiment, the d-axis is a rotation axis that face in the direction of the magnetic flux of the permanent magnet provided at the rotor of the generator 1a. θ is an angle (electric angle) of the d-axis for the generator 1a viewed from the U-phase axis, and ω is rotation speed (angular speed in electric angle) of the d-axis for the generator 1a.

The generator 1a for example is connected to a windmill through gears. And the rotating force of the windmill by the wind power is transmitted to the rotor of the generator 1a through the gears, which generates torque at the rotor and the rotor is rotated. The induced voltage generated within the generator 1a by the rotation of the rotor is transmitted to the voltage conversion circuit 2a as a three-phase AC voltage that is composed of the $v_u$, the $v_v$, and the $v_w$. The voltage conversion circuit 2a for example is a PWM (Pulse Width Modulation) converter and converts the three-phase AC voltage to a DC voltage while performing pulse width modulation such that the voltage values of the $v_u$, the $v_v$, and the $v_w$ that constitute the three-phase AC voltage respectively coincide with the $v_u^*$, the $v_v^*$, and the $v_w^*$ given from the 2/3 converter 19. This DC voltage and the electric power from the DC voltage are outputted from the voltage output parts 4a. As such, the electric power outputted from the voltage output parts 4a is based on the electric power generated at the generator 1a.

In the power generating system, the generator current i is broken down to the d-axis current $i_d$ which is the excitation current component, and the q-axis current $i_q$ which is the torque current component, and vector control is performed such that they follow the current command values. The generator control device 3a includes each part that is referred to by the numerical symbols 11-19, 30, and 31. The structure and function of each part within the generator control device 3a are the same as the structure and function of each part within the motor control device 3, and the current sensors 10 in the power generating system are the same as those shown in FIG. 10.

In other words, the current sensors 10 output analog signals indicating current values of the U-phase current $i_u$ and the V-phase current $i_v$ that flow between the generator 1a and the voltage conversion circuit 2a. A current detection unit 11 detects the U-phase current $i_u$ and the V-phase current $i_v$ based on the output signals from the current sensors 10. The current value of the W-phase current $i_w$ is computed from the relational expression "$i_w = -i_u - i_v$," utilizing the detected current values $i_u$ and $i_v$. The 3/2 converter 12 computes the iα and the iβ from the $i_u$ and the $i_v$, and the coordinate converter 13 converts the iα and the iβ to the $i_u$ and the $i_v$ based on the estimated magnetic pole position θ. The position/speed estimator 14 computes the estimated rotation speed ω and the estimated magnetic pole position θ by using for example all or part of the $v_d^*$, the $v_q^*$, the $i_d$, and the $i_q$.

The speed command generation unit, not shown, generates a rotation speed command value ω* for rotating the rotor of the generator 1a in a desired rotation speed (electric angular speed). For example, the desired rotation speed is set such that a large amount of electric power can be drawn out from the generator 1a as much as possible. The speed control unit 17 computes the $i_q^*$ such that the velocity deviation (ω*−ω) converges to zero, and the flux control unit 16 computes the $i_d^*$ depending on the kind of the vector control executed at the power generating system and the rotation speed. In addition, since the polar character of the current (the direction that the current flows) differs between the motor drive system of FIG. 10 and the power generating system of FIG. 12, it is made such that $i_q^* = 0$ in the motor drive system of FIG. 10, whereas it is made such that $i_q^* = 0$ in the power generating system of FIG. 12.

The torque/current conversion unit 31 computes the q-axis current correction value $i_{qC}$ from the torque constant $K_T$ and from the estimated torque fluctuation component $T_{rp}$ computed at the torque fluctuation component estimation unit 30. The current control unit 15 computes the $v_d^*$ and the $v_q^*$ such that $(i_d^* - i_d)$ and $(i_q^* - i_q - i_{qC})$ both converge to zero by current feedback control utilizing for example the proportional-integral control. The $v_d^*$ and the $v_q^*$ are converted to the vα* and the vβ* by using the estimated magnetic pole position θ at the coordinate converter 18, and the vα* and the vβ* are further converted to the three-phase voltage command values ($v_u^*$, $v_v^*$, and $v_w^*$) at the 2/3 converter 19. The three-phase voltage command values from the 2/3 converter 19 are given to the voltage conversion circuit 2a.

The torque fluctuation component estimation unit 30 computes the estimated torque fluctuation component $T_{rp}$ based on information for estimation including the values computed within the generator control device 3a. The computation methods of the estimated torque fluctuation component $T_{rp}$ by the torque fluctuation component estimation unit 30 are the same as those described in the first embodiment. In addition, in the power generating system, the iv such as in the formula (C-10) indicates generated output of the generator 1a by the rotation of the rotor.

By constructing the power generating system as described above, fluctuation of the generated torque of the generator 1a can be restrained, and vibration and noise that derive from such fluctuation can be reduced.

<<Modifications>>

The following notes 1 to 7 are provided as the modifications of the above-described embodiments or the explanatory notes. The contents described in each of the notes can be combined arbitrarily as long as they are not contradictory.

[Note 1]

In the above-described motor drive system or power generating system that performs vector control, the dq axes are being estimated. In other words, the phase of the d-axis with respect to the U-phase axis (that is θ) is estimated and feedback control is performed such that the d-axis current and the q-axis current respectively follow the d-axis current command value and the q-axis current command value. However, the axes to be estimated can be other than the dq axes. For example, it is possible to perform vector control by defining the dm-axis and qm-axis such as described in Japanese Patent Laid-Open No. 2007-259686, by breaking down the motor current (or the generator current) i into the dm-axis component and the qm-axis component according to the method described in this publication, and performing vector control such that each component obtained by the breakdown follows the respective command value.

In this case, the values concerning the d-axis and the q-axis described above may be read as the values concerning the dm-axis and the qm-axis respectively (for example, the d-axis current $i_d$ which is the d-axis component of the motor current i is read as the dm-axis current $i_{dm}$ which is the dm-axis component of the motor current i). The dm-axis is an axis that is 90 degrees behind in electric angle from the qm-axis. The qm-axis is a rotation axis having the same direction as the current vector at the time of realizing maximum torque per ampere control (or maximum efficiency control and so on).

[Note 2]

Although the rotation speed ω and the magnetic pole position θ are derived by estimation in the above-described motor drive system and power generating system, they also can be derived based on an output signal of a magnetic pole position sensor (such as a hall element or a resolver) that outputs a signal according to the magnetic pole position θ.

[Note 3]

Although the U-phase current $i_u$ and the V-phase current $i_v$ are detected directly by using the current sensors 10 in the above-described motor drive system and power generating system, they also can be detected based on the DC current that flows between the voltage conversion circuit 2 and the power source 4 or the DC current that flows between the voltage conversion circuit 2a and the voltage output parts 4a.

[Note 4]

The derivation method of all the values to be derived including the various command values (such as the $i_d^*$ and the $i_q^*$) and the state quantities (such as the $i_d$, and the $i_q$) described above is arbitrary. That is, for example, they may be derived by computation within the motor control device or the generator control device, or they may be derived from table data that are previously set.

[Note 5]

A part or all of the functions of the motor control device (or the generator control device) are achieved by using software (program) incorporated such as in a general microcomputer. When the motor control device (or the generator control device) is achieved by using the software, the block diagram showing the configuration of each part of the motor control device (or the generator control device) indicates a functional block diagram. Naturally, it also is possible to form the motor control device (or the generator control device) only with hardware rather than the software (program) or with a combination of the software and the hardware.

[Note 6]

Each of the motor and the generator is a kind of a rotational machine. Therefore, each of the motor control device and the generator control device also may be called a rotational machine control device.

[Note 7]

In this specification and the figures, the following point should be noted. In the figures, the Greek alphabets (such as a) that are expressed as so-called subscript also can be expressed as standard letters that are not subscript. This difference between the subscript and standard letters of the Greek alphabets should be ignored. In other words, for example, $i_\alpha$ indicates the same thing as ia, and $i_\beta$ indicates the same thing as iβ.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

What is claimed is:

1. A motor control device that controls a motor with a stator having armature winding and a rotor having a permanent magnet, comprising:
    a torque fluctuation component estimation unit for estimating a torque fluctuation component generated at the motor based on flux-linkage of the armature winding and an armature current that flows the armature winding;
    wherein the motor control is performed based on the estimated torque fluctuation component;
    wherein the torque fluctuation component estimation unit estimates the torque fluctuation component based on an inner product of a flux-linkage vector which is a vectorial representation of the flux-linkage or a vector according to the flux-linkage and a current vector which is a vectorial representation of the armature current, and
    wherein when a first component and a second component of the flux-linkage vector or the vector according to the flux-linkage are respectively $\phi_1$ and $\phi_2$, and a first component and a second component of the current vector are respectively $i_1$ and $i_2$, the inner product is $\phi_1 i_1 + \phi_2 i_2$.

2. The motor control device of claim 1,
    wherein the inner product is an inner product of the flux-linkage vector and the current vector, and
    wherein the torque fluctuation component estimation unit estimates the torque fluctuation component based on an amount of inner product change with respect to an amount of magnetic pole position change of the rotor per unit time.

3. The motor control device of claim 1,
    wherein the torque fluctuation component estimation unit derives differential information or difference information of the flux-linkage which represents the amount of flux-linkage change with respect to the amount of magnetic pole position change of the rotor per unit time,
    wherein a vector of the differential information or the difference information is a vector according to the flux-linkage vector; and
        wherein the inner product is an inner product of the vector according to the flux-linkage vector and the current vector.

4. A motor control device that controls a motor with a stator having armature winding and a rotor having a permanent magnet, comprising:
    a torque fluctuation component estimation unit for estimating a torque fluctuation component generated at the motor based on input electric power to the motor for driving the rotor, rotation speed of the rotor, and an exterior product of a flux-linkage vector which is a vectorial representation of the flux-linkage of the armature winding and a current vector which is a vectorial representation of the armature current that flows the armature winding,
    wherein the motor control device controls the motor based on the estimated torque fluctuation component, and
    wherein when a first component and a second component of the flux-linkage vector or the vector according to the flux-linkage are respectively $\phi_1$ and $\phi_2$, and a first component and a second component of the current vector are respectively $i_1$ and $i_2$, the exterior product is $\phi_1 i_1 - \phi_2 i_2$.

5. The motor control device of claim 4, wherein the torque fluctuation component estimation unit estimates the torque fluctuation component from a difference between (a) a value obtained by dividing the input electric power by the rotation speed, or a value obtained by dividing the input electric power from which loss electric power including a loss at the armature winding is subtracted by the rotation speed, and (b) a value that is proportional to the exterior product.

6. The motor control device of claim 1, wherein the motor control device performs vector control of the motor based on the estimated torque fluctuation component.

7. The motor control device of claim 4, wherein the motor control device performs vector control of the motor based on the estimated torque fluctuation component.

8. The motor control device of claim 6, further comprising:
    a current detection unit for detecting the armature current by using a current sensor;
    a torque current component derivation unit for deriving a torque current component of the detected armature current based on the magnetic pole position of the rotor; and
    a torque/current conversion unit for converting the estimated torque fluctuation component to current information by using a torque constant,
    wherein the motor control device corrects the derived torque current component by using the current information, and performs the vector control such that the corrected torque current component follows a torque current command value according to a target value for the torque.

9. The motor control device of claim 7, further comprising:
    a current detection unit for detecting the armature current by using a current sensor;
    a torque current component derivation unit for deriving a torque current component of the detected armature current based on the magnetic pole position of the rotor; and
    a torque/current conversion unit for converting the estimated torque fluctuation component to current information by using a torque constant,
    wherein the motor control device corrects the derived torque current component by using the current information, and performs the vector control such that the corrected torque current component follows a torque current command value according to a target value for the torque.

10. A generator control device that controls a generator with a stator having armature winding and a rotor having a permanent magnet, comprising:

a torque fluctuation component estimation unit for estimating a torque fluctuation component generated at the generator based on flux-linkage of the armature winding and an armature current that flows the armature winding, wherein the generator control device controls the generator based on the estimated torque fluctuation component, wherein the torque fluctuation component estimation unit estimates the torque fluctuation component based on an inner product of a flux-linkage vector which is a vectorial representation of the flux-linkage or a vector according to the flux-linkage and a current vector which is a vectorial representation of the armature current; and wherein when a first component and a second component of the flux-linkage vector or the vector according to the flux-linkage are respectively $\phi_1$ and $\phi_2$, and a first component and a second component of the current vector are respectively $i_1$ and $i_2$, the inner product is $\phi_1 i_1 + \phi_2 i_2$.

11. A generator control device that controls a generator with a stator having armature winding and a rotor having a permanent magnet, comprising:

a torque fluctuation component estimation unit for estimating a torque fluctuation component generated at the generator based on generated electric power of the generator by the rotation of the rotor, rotation speed of the rotor, and an exterior product of a flux-linkage vector which is a vectorial representation of the flux-linkage of the armature winding and a current vector which is a vectorial representation of the armature current that flows the armature winding, wherein the generator control device controls the generator based on the estimated torque fluctuation component;

wherein when a first component and a second component of the flux-linkage vector or the vector according to the flux-linkage are respectively $\phi_1$ and $\phi_2$, and a first component and a second component of the current vector are respectively $i_1$ and $i_2$, the exterior product is $\phi_1 i_1 - \phi_2 i_2$.

\* \* \* \* \*